United States Patent [19]
Heller et al.

[11] 3,808,775
[45] May 7, 1974

[54] APPARATUS FOR DRYING AND SUPERHEATING STEAM

[75] Inventors: Laszlo Heller; Laszlo Szucs; Zoltan Szabo, all of Budapest, Hungary

[73] Assignee: Energiagazdalkodsi Intezet, Budapest, Hungary

[22] Filed: Sept. 20, 1971

[21] Appl. No.: 181,918

[30] Foreign Application Priority Data
Sept. 21, 1970  Hungary.............................. OE 573

[52] U.S. Cl..................... 55/269, 55/484, 122/483, 122/488, 165/119
[51] Int. Cl........................................... B01d 46/12
[58] Field of Search ............................. 55/261–266, 55/324, 483, 484; 122/483, 488, 34; 165/119

[56] References Cited
UNITED STATES PATENTS

| | | | |
|---|---|---|---|
| 3,139,020 | 6/1964 | Schemenauer........................ | 55/324 |
| 3,656,281 | 4/1972 | Bansal et al. ......................... | 55/269 |
| 3,667,430 | 6/1972 | Hubble et al. ....................... | 122/483 |
| 2,746,726 | 5/1956 | Hoff...................................... | 55/269 |

FOREIGN PATENTS OR APPLICATIONS
931,235  7/1963  Great Britain........................ 55/269

*Primary Examiner*—Bernard Nozick
*Attorney, Agent, or Firm*—Blum Moscovitz Friedman & Kaplan

[57] ABSTRACT

An apparatus for drying and superheating steam. The apparatus includes a moisture-separator through which steam is initially directed to remove moisture therefrom, this separator having a relatively large discharge end through which the dried steam flows upon leaving the moisture-separator. Connected to this latter discharge end of the moisture-separator is a heat-exchanger for superheating the dried steam, this heat-exchanger having a receiving end fixed to the discharge end of the moisture-separator and this receiving end of the heat-exchanger is approximately of the same area as the discharge end of the moisture-separator.

8 Claims, 4 Drawing Figures

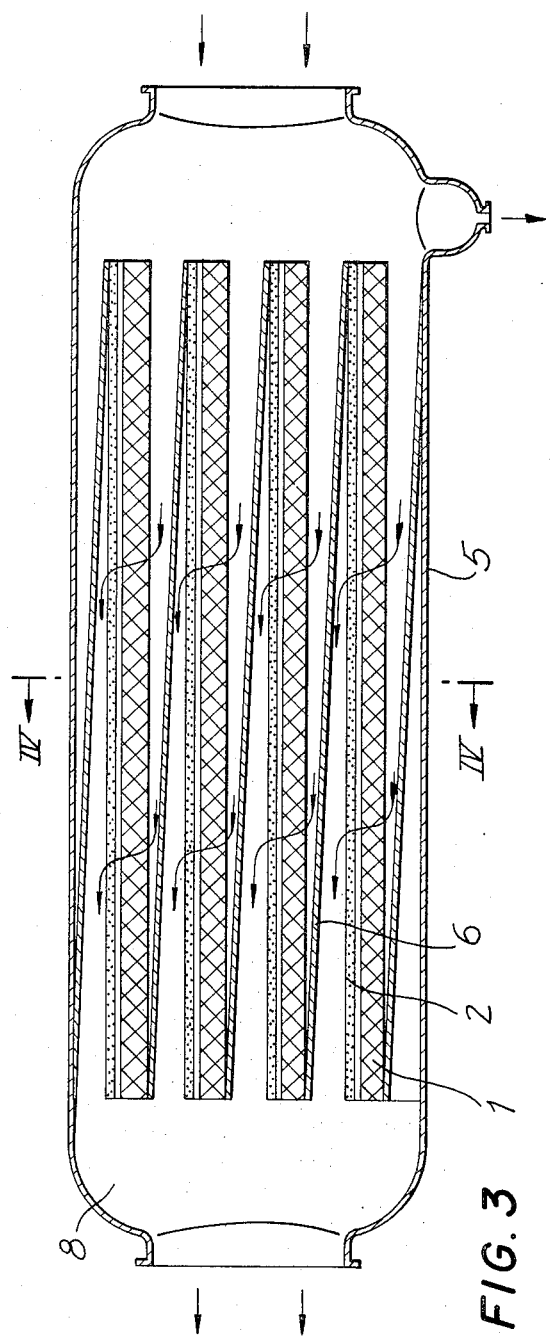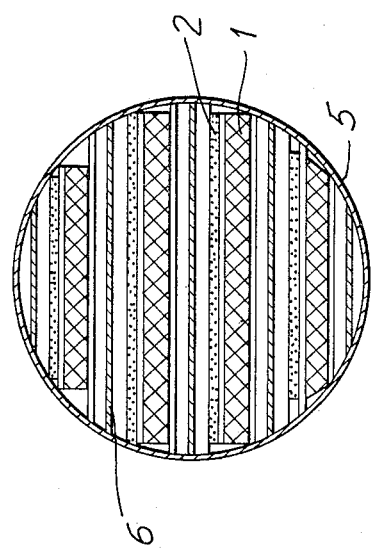

APPARATUS FOR DRYING AND SUPERHEATING STEAM

BACKGROUND OF THE INVENTION

The present invention relates to apparatus for drying and superheating steam.

Such apparatus is generally built into a common space and is suitable for eliminating moisture and thus drying steam and for subsequently superheating the saturated dried steam.

Apparatus of this type, to which the present invention relates, is particular suitable for use in nuclear power plants operating with saturated steam cycles (PWR, BWR, PHWR, CANDU, . . . ). Thus, conventional appparatus of the above general type have a moisture-separator and a heat-exchanger built into a common space.

As is well known, those moisture-separators which have the best efficiency are of the so-called low flow-velocity type. While the steam travels at a small velocity while flowing through the moisture-separator, the steam is dried according to impact coagulation and separation of the moisture from the steam. Modern moisture-separator structures of this type include, for example, wire mesh units having closely juxtaposed thin wires extending in different directions. (See, for example, 1. Gloger, M., Probleme der Wasserabscheidung in Nassdampfturbinen, BWK 22 /1970/ Nr. 9. September;
2. Hossli, W., Probleme beim bau von Turbinen fur Atomkraftwerke, BBC Ausgabe; and
3. Grotloh, Kh., Wasserabscheider and Zwischenuberhitzer in Kernkraftanlagen, Tech. Rund Sulzer, 1970. H.1.)

The steam flows at a low rate of speed through such an apparatus in order to achieve a high degree of moisture separation with a low pressure drop. The small frontal velocity or low speed of travel of the steam during drying thereof requires a very large transverse area for the moisture-separator so that the steam is distributed over a very large area while traveling through the separator in order to be dried thereby.

The steam which is dried must then be superheated in a heat exchanger. Such a superheater or reheater conventionally is a turbulence-type of apparatus which in modern equipment is of a finned U-tube configuration. (See for example, 2. Hossli, W., Probleme beim bau von Turbinen fur Atomkraftwerke, BBC Ausgabe; and
3. Grotloh, Kh., Wasserabscheider und Zwischenuberhitzer in Kernkraftanlagen, Tech. Rund Sulzer, 1970. H.1.)

Such apparatus requires, in order to achieve an efficient exchange of heat, a great heat-transfer coefficient and a much higher velocity of flow for the steam than that which prevails in the moisture-separator. As a result such heat-exchangers have a much smaller transverse area across which the steam is distributed while flowing through the heat-exchanger.

Depending upon the particular type of heat-exchanger, there will be a substantial pressure drop, on the order of 3–6 percent, but on the other hand the surface area and size of the heat exchanger will be satisfactory. It is to be emphasized also that the dimensions of the container shell which receives the above structure will necessarily be extremely great as compared to the volume occupied by the moisture separator and heat-exchanger each by themselves, so that the cost of such an enclosure or shell is undesirably high and also there are undesirably high installation and building costs. This latter disadvantage results from the fact that different hydraulic and thus design characteristics are required for the moisture-separator on the one hand and the heat-exchanger on the other hand, with the result that there are inevitably extremely large dead spaces in the combining of these structures.

SUMMARY OF THE INVENTION

It is accordingly a primary object of the present invention to provide a structure which will avoid the above drawbacks.

Thus, it is an object of the invention to provide a solution which is far more economical than has heretofore been possible.

Furthermore, it is more specifically an object of the present invention to provide a structure of the above type which in order to accomplish results accomplished by conventional structures requires only about one-third of structures volume of such conventional structures.

Also, it is an object of the present invention to provide a structure which will greatly reduce the pressure drop presently inherent in conventional structures.

According to the invention the apparatus includes a moisture-separating means which has a discharge end of relatively large area beyond which the steam flows after it has been dried by the moisture-separating means. To the discharge end of the moisture-separating means is connected a receiving end of a heat-exchanger means in which the dried steam is superheated. Thus, the heat-exchanger means provides a series connection with the moisture-separating means for receiving the dried steam therefrom. The receiving end of the heat-exchanger means is of approximately the same area as the discharge end of the moisture-separating means, so that an exceedingly compact structure is provided, and the heat-exchanger means has a large number of relatively narrow passages through which the steam flows to be superheated so that the rate of flow of steam in the heat-exchanger is substantially the same as the rate of flow of the steam through the moisture-separating means.

BRIEF DESCRIPTION OF DRAWINGS

The invention is illustrated by way of example in the accompanying drawings which form part of this application and in which:

FIG. 3 is a longitudinal sectional elevation of an enclosure with a plurality of the units of the invention enclosed therein; and FIG. 4 is a transverse sectional elevation of the structure of FIG. 3 taken along line 4—4 of FIG. 3 in the direction of the arrows.

DESCRIPTION OF A PREFERRED EMBODIMENT

Figure 1:
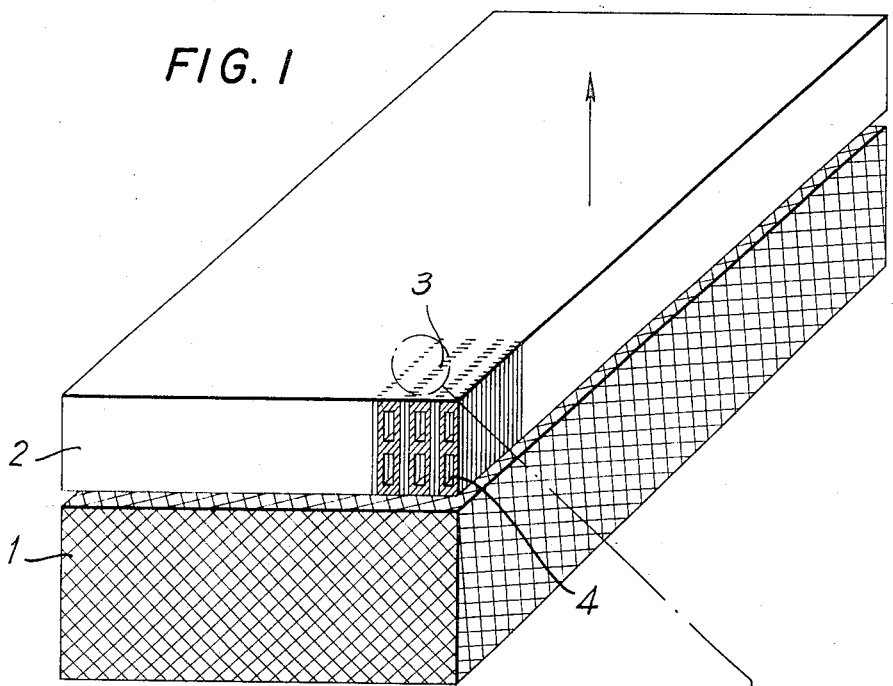
FIG. 1 is a schematic perspective illustration of the combination of a moisture-separator means and heat-exchanging means in accordance with the invention.

In accordance with the present invention the structure is designed in such a way that it will have both the moisture-separating means and the heat-exchanger means coacting in the same manner with the fluid which is treated, namely the steam, so that in effect the two structures which are joined to form the moisture-separator and heat-exchanger unit have the same character with respect to the fluid which is treated. The particular moisture separator which is used for each of the units of the invention corresponds to the above well known modern moisture separator made of the wire mesh having the wires extending in different directions. This moisture-separator has a relatively large transverse cross section across which the fluid flows at a relatively slow rate, as pointed out above, and the heat-exchanger will have the same character or type of operation with respect to the steam which is superheated thereby. Thus, the heat exchanger also will have approximately the same transverse or cross-sectional area across which the steam is distributed while flowing through the heat exchanger with substantially no increase in speed as compared with the rate of flow through the moisture-separator. Thus, the discharge end of the moisture-separator beyond which the steam flows in a dried condition has an area which is approximately the same as the receiving end of the heat-exchanger which receives the dried steam in order to superheat the latter, and both of the latter parts, namely the discharge end of the moisture-separator means and the receiving end of the heat-exchanger means are joined to each other at a common plane therebetween. In this way a compact structure occupying a relatively small amount of space is provided by sandwiching or in other words joining together the moisture-separating means and the heat-exchanging means in end-to-end relation providing a series connection one with respect to the other, insofar as the flow of the steam from the moisture-separator to the heat-exchanger is concerned.

This latter type of arrangement of the present invention is in sharp contrast with conventional arrangements where because of the structure of the conventional heat-exchangers which are currently in use, the dried steam received from the moisture-separators at a relatively small flow velocity must have its velocity of flow increased since a relatively small flow velocity with conventional heat-exchangers would result in an extremely poor transfer of heat with consequent requirements of extremely large surface areas for the heat-exchanger and thus extremely large structures occupying a large volume and requiring a large amount of material.

Therefore, in order to achieve the outstanding results of the present invention a special heat-exchanger is provided.

This unique heat-exchanger of the present invention has its construction based upon a well known physical principle which could not be utilized up to the present time in heat-exchangers designed for general applicability to all types of fluids. However, this special heat-exchanger of the present invention can be used for the special situations for which the structure of the present invention is particularly designed.

Thus, it is known that where an extremely thin laminar flow is provided for the fluid there is an extremely favorable heat transfer with the possibility of exceeding the normal values by one order of magnitude, which is to say the heat-transfer coefficient can be one order of magnitude greater than can be achieved with conventional heat-exchangers while at the same time the extent of pressure drop is very greatly reduced. It is possible to achieve these results if the passages of the heat exchanger through which the steam flows are made exceedingly narrow so that in effect the fluid or steam is divided up into extremely thin substantially flat laminar streams which flow through slots of extremely narrow size in such a way as to achieve an extremely efficient heat transfer even though the flow rate is relatively low, while at the same time maintaining a pressure drop which is less than has heretofore been possible. In accordance with the present invention the width of the passages through which the dried steam flows to be superheated at the heat-exchanger is less than 0.7 mm. The moisture-separator and heat-exchanger are joined to each other at a common plane which is perpendicular to these passages or at least at a substantial angle thereto.

Up to the present time such extremely narrow passages could not be used in practice because they would easily become clogged or fouled with deposits from the fluid which is treated. On the other hand, it would have been required that a heat exchanger should be applied over an extremely large area in order to achieve a favorable pressure drop, and this latter requirement would have resulted in extremely great difficulty in the layout design of the unit.

However, in the present case the fluid which is treated is superheated steam which is perfectly clean. In fact, this steam which is heated in the heat-exchanger of the invention is a dry saturated steam which has been expanded in the high pressure turbine of a nuclear plant and which has been dried by the moisture-separator, so that there is no possibility of clogging or fouling of the extremely narrow passages of the heat-exchanger of the invention. On the other hand, the heat-exchanger of the invention is of great advantage in that since the velocity of flow at the moisture-separator must in any event be small, the same low flow velocity can be advantageously used with the laminar type of heat exchanger of the present invention, and therefore the large area at the discharge end of the moisture-separator from which the dried steam flows to the receiving end of the heat-exchanger can be located directly next to a receiving end of the heat-exchanger which is of the same large area so that the cross sections of both the moisture-separator and the heat-exchanger can be substantially equal with equal distribution of the fluid over the entire cross section. As a result, the extremely compact laminar type of heat-exchanger of the present invention can be utilized with a low velocity of flow of the steam with a resulting advantage rather than a drawback.

In accordance with the present invention a series of units, each of which includes a moisture-separator means and a heat-exchanger means, are combined into a unitary assembly which has the structure shown in FIGS. 3 and 4. Each of these units has the structure shown in FIG. 1, while FIG. 2 shows in detail the structure of the heat exchanger. Thus, as may be seen from FIG. 1, the moisture-separating means 1 is in the form of an elongated structure made up of a wire mesh which in itself is known with this structure having a generally rectangular configuration at all of its faces. However it will be noted that the top and bottom faces of the moisture-separating means 1 ar of a relatively large area. In fact these end faces are of considerable length and width while the depth of the moisture-separating means is of a relatively small magnitude as compared particularly to its length and also it is small as compared with respect to its width. The top end of the moisture-separating means 1 of FIG. 1 forms the discharge end of the latter, and it is beyond this end that the dried steam flows upwardly in the direction of the arrows indicated in FIG. 1. This top end of the moisture-separating means 1 is directly joined to and fixed with the bottom end of the heat-exchanging means 2 which it will be noted is also of an elongated rectangular configuration having a relatively long length as compared to its width and depth with the latter also being substantially less than the width. While the depth of the heat-exchanger means 2 is somewhat less than that of the moisture-separating means 1, the cross-sectional area of the heat exchanger 2 at its top and bottom ends is identical with the cross-sectional area of the moisture-separating means 1 at its top and bottom ends, so that the bottom or receiving end of the heat exchanger 2 can be directly fixed to and joined with the top or discharge end of the moisture-separating means 1, with these ends of the moisture-separating means 1 and heat-exchanging means 2 being joined to each other at a common plane and with both of these ends having the same area at this common plane. As a result the steam which flows up through the moisture-separating means 1 continues without interruption to flow through the heat-exchanging means 2, which thus provides a series connection with the moisture-separating means 1, and the structure of the heat-exchanging means 2 is such that the speed of flow of the steam during superheating thereof by the heat-exchanging means 2 remains at the low value comparable to that of the steam flowing through the moisture-separating means 1.

As is particularly apparent from FIG. 2, the heat-exchanging means 2 is made up of a series of elongated bodies joined in side-by-side relation with these bodies being formed in its opposed sides with the vertical notches. The vertical notches of one body are joined to and register with the vertical notches of the next body, so that in this way the adjoining notches of a pair of adjoining bodies of the heat exchanger form the extremely narrow passages 3. These passages are shown at a relatively large scale in FIG. 2. They actually are extremely narrow slits formed in the side surfaces of the series of bodies which are joined together to form the heat exchanger, and they have a width in the longitudinal direction of the heat exchanger which is no greater than 0.7 mm. Thus by forming these side slits in the opposed side surfaces of the series of bodies which form the heat exchanger, the heat exchanger has an extremely large number of extremely narrow vertically extending passages through which the steam is compelled to flow, providing in this way a substantially laminar flow of the steam with an exceedingly efficient heat exchange taking place in the narrow passages 3. It will be noted that these narrow passages 3 extend perpendicularly with respect to the common plane at the junction between the moisture-separating means 1 and the heat-exchanging means 2.

The elongated bodies which are joined together in side-by-side relation to form the heat exchanger 2 are also formed with elongated longitudinally extending passages 4 which receive the hot steam from which heat is derived for heating the dried steam which moves up through the passages 3. These ducts or passages 4 for the hot steam extend parallel to the common plane between the moisture-separating means 1 and heat-exchanging means 2, so that these elongated passages 4 are also perpendicular to the passages 3. Thus, the passages 4 will contain the superheating medium which in general will be a steam which is mostly a condensing saturated steam the temperature of which is suitable for superheating the steam which is received from the moisture-separating means 1.

Figure 2:
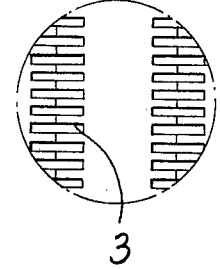
FIG. 2 is an enlarged illustration of the indicated circular area of FIG. 1 to show details of the heat-exchanger means.

A plurality of the units each of which have the structure shown in FIG. 1 are joined together to form an entire assembly as illustrated in FIGS. 3 and 4. A pair of baffles 6 are situated above and below each unit. Thus, each baffle 6 has an upper surface which directs the incoming moist steam up through the moisture-separating means. From the latter the steam flows directly through the heat-exchanging means and the lower surface of the next-higher baffle 6 directs the superheated dried steam away from each unit.

As may be seen from FIGS. 3 and 4 a plurality of the units of the invention are situated in a common enclosure 5 in the form of an elongated cylindrical enclosure in which the several units are supported at the elevations illustrated in any suitable way with the units having different widths in order to be accommodated in the interior of the enclosure 5 in the manner shown in FIG. 4.

The several baffles 6 are also arranged between the several units in the manner illustrated most clearly in FIG. 3. The elongated cylindrical enclosure 5 has a receiving chamber 7 which receives the incoming steam which is to be treated and a collecting chamber 8 from which the dried superheated steam flows as shown by the arrows at the left of FIG. 3. FIG. 3 also illustrates schematically pipes which are connected to the passages 4 so as to direct therethrough the steam from which heat is derived for super-heating the steam which is received at the chamber 7.

The above-described structure operates as follows:

The steam which contains moisture is received with a relatively low velocity over the relatively large area of the several moisture separators which operate to separate the water from the steam, and the separated liquid collect at the lower right of the container 5, as viewed in FIG. 3, which illustrates a suitable drain provided at this part of the structure.

The practically dry, saturated steam, after flowing through the moisture-separating means of each unit will be received in the heat-exchanger thereof and the steam flows upwardly through the several heat exchangers with practically an unchanged velocity while being distributed over the same area. In this connection it is emphasized that the velocity referred to is the velocity of the steam with respect to the total area of the end face of the moisture-separator which is joined to the end face of the heat exchanger. In other words the lower end of each heat exchanger and the upper end of each moisture separator joined thereto are joined to each other at a common plane which has at these ends a given area, and the rate of flow of the steam through the moisture separator with respect to this latter area is the same as the rate of flow of the steam through the heat exchanger with respect to this latter area. This is not to say that at any one particular localized area of the heat exchanger, for example, there may be in some passages 3 a rate of flow of steam which differs from the rate of flow at other passages. Inasmuch as the heating medium within the passages 4 is hotter than the steam flowing upwardly through the passages 3, which is to say the passages 4 may contain a saturated steam having a saturation presure which corresponds to the required temperature, then as a result there is a transfer of heat which will superheat the dried steam flowing upwardly from the heat exchanger means of each unit so that a relatively cool steam flows out of the passages 4 through the pipes shown at the right of FIG. 3 while a relatively hot dry super-heated steam is received at the collecting chamber 8. The steam which flows out of the passages 4 may in fact be condensed to a given extent when it leaves the heat exchangers.

It will be noted that the several baffles 6 of FIG. 3 distribute the steam received in the chamber 7 among the several moisture separators and after moisture-separation and superheating the steam is directed by the very same baffles to the collecting chamber 8.

With the present invention it is possible, particularly in connection with nuclear power plants, to construct a steam drying and supperheating apparatus in a manner which requires only a fraction of the cost of conventional apparatus designed to produce comparable results. It is possible with a structure according to the present invention to produce with the structure of the present invention approximately three times as much dried superheated steam as can be produced with conventional equipment occupying the same space. This conclusion has been proved by a comparison with conventional structures. (See Hossli, W., Probleme beim bau von Turbinen fur Atomkraftwerke, BBC Ausgabe; Grotloh,Kh., Wasserabscheider und Zwischenuberhitzer in Kernkraftanlagen, Tech. Rund Sulzer, 1970. H.1.).

On the other hand, experience has shown that the pressure drop in the heat exchanger of the invention, instead of being on the order of 3–6 percent, as is conventional at the present time, is on the order of 0.2–0.5 percent, so that the outstanding results of the present invention are readily apparent.

What is claimed is:

1. In an apparatus for drying and superheating steam, moisture-separating means of substantially slab form for separating moisture from steam flowing through the moisture-separating means, said moisture-separating means having a discharge face of relatively large area through which the steam flows perpendicularly with respect to said discharge face beyond said moisture-separating means after the steam has been dried thereby, and heat-exchanger means of substantially slab form coextensive with superposed to a fixed to said discharge face of said moisture-separating means for receiving the dried steam therefrom to provide a series-connection with said moisture-separating means and for providing for the dried steam a laminar flow beyond said moisture-separating means perpendicular with respect to said discharge face thereof so that the direction of flow of the dried steam does not change from said moisture-separating means to and through said heat-exchanger means, said heat-exchanger means acting on the dried steam to superheat the latter, and said heat-exchanger means having a receiving face of substantially the same area as said discharge face of said moisture-separating means fixed to said discharge face for receiving the dried steam therefrom, said receiving face of said heat-exchanger means and said discharge face of said moisture-separating means being joined to each other at a common plane which is the interface of said slabs and said heat-exchanger means being formed with passages therethrough parallel to said faces and side edges of said heat exchanger slab for receiving a medium from which heat is extracted to heat the dried steam, and said heat-exchanger means being formed with narrow slit passages extending from the receiving face to the discharge face of same for the dried steam to provide laminar flow therethrough and situated between while extending perpendicularly to said passages for the medium from which heat is extracted.

2. The combination of claim 1 and wherein the passages for the dried steam are of a narrow configuration having a width which does not exceed 0.7 mm.

3. The combination of claim 1 and wherein a pair of baffles are situated one below said moisture-separating means and the other above said heat-exchanger means for directing incoming steam to said moisture-separating means and superheated dried steam away from said heat exchanger means.

4. The combination of claim 3 and wherein a series of units each formed by one of said moisture-separating means and one of said heat-exchanger means are situated one above the other with one baffle between each pair of successive units having an upper surface for directing incoming steam upwardly to the moisture-separating means of the unit over said one baffle and a lower surface for directing dried superheated steam away from the heat-exchanger means of the unit below said one baffle.

5. The combination of claim 4 and wherein an enclosure surrounds and contains all of said units and baffles.

6. The combination of claim 5 and wherein said enclosure has a receiving chamber for receiving steam to be directed by baffles to the plurality of the moisture-separating means of said units and a collecting chamber for collecting the superheated dried steam flowing from the heat-exchanger means of aid units.

7. The combination of claim 6 and wherein said enclosure is of a generally cylindrical configuration having said receiving and collecting chambers at its opposed ends.

8. The combination of claim 7 and wherein said enclosure has at said receiving end a drain for moisture separated from the steam.

* * * * *